US010867358B2

(12) United States Patent
Cronin et al.

(10) Patent No.: US 10,867,358 B2
(45) Date of Patent: Dec. 15, 2020

(54) EMPLOYEE DETERMINED PAYROLL PAYMENT PROCESSING METHOD AND SYSTEM

(71) Applicant: FLEXIWAGE LIMITED, Dungarvan (IE)

(72) Inventors: Anthony Cronin, Cork (IE); Niall Cusack, Tramore (IE); Gerard Duffy, Dublin (IE); John Phelan, Dublin (IE); Paul Ryan, Cornwall (GB)

(73) Assignee: Flexiwage Limited, Dungarvan (IE)

( * ) Notice: Subject to any disclaimer, the term of this patent is extended or adjusted under 35 U.S.C. 154(b) by 89 days.

(21) Appl. No.: 16/345,433

(22) PCT Filed: Oct. 25, 2017

(86) PCT No.: PCT/EP2017/077351
§ 371 (c)(1),
(2) Date: Apr. 26, 2019

(87) PCT Pub. No.: WO2018/077974
PCT Pub. Date: May 3, 2018

(65) Prior Publication Data
US 2019/0272597 A1    Sep. 5, 2019

(30) Foreign Application Priority Data
Oct. 28, 2016    (EP) .................................... 16196437

(51) Int. Cl.
*G06Q 40/00* (2012.01)
*H04L 29/06* (2006.01)
(Continued)

(52) U.S. Cl.
CPC ........... *G06Q 40/125* (2013.12); *G06Q 20/10* (2013.01); *G06Q 20/405* (2013.01); *H04L 63/083* (2013.01)

(58) Field of Classification Search
None
See application file for complete search history.

(56) References Cited

U.S. PATENT DOCUMENTS 6,401,079 B1 *  6/2002  Kahn ................... G06Q 20/102
                                                  705/30
6,411,938 B1 *  6/2002  Gates .................. G06Q 20/042
                                                  705/30
(Continued)

FOREIGN PATENT DOCUMENTS

WO         01/59663 A1     8/2001
WO      2009/076705 A1     6/2009

OTHER PUBLICATIONS

International Search Report issued in PCT/EP2017/077351; dated Dec. 20, 2017.

*Primary Examiner* — Oluseye Iwarere
*Assistant Examiner* — Seye Iwarere
(74) *Attorney, Agent, or Firm* — Studebaker & Brackett PC (57) ABSTRACT

Processing payroll payments for employees is performed by a payment processing system and employee devices, so that the employee can with access security set short pay periods and have wage payments made according to their profile. The payment processing system has an interfacing server, a storage server, and a processing server, using internal signalling and file transfer. They receive from an employer computer net pay data for employees for a long period, and communicating with the employee devices to determine a desired payment split over the long period, and automatically notify an employee device of opening of a window for user editing of a payment split profile, and subsequently are instructed by the employee device as to edit the profile.

23 Claims, 4 Drawing Sheets

(51) Int. Cl.
*G06Q 20/40* (2012.01)
*G06Q 20/10* (2012.01)

(56) References Cited

U.S. PATENT DOCUMENTS

| | | | | |
|---|---|---|---|---|
| 7,107,534 B1* | 9/2006 | de Jong | H04L 41/22 | 715/734 |
| 7,249,073 B1* | 7/2007 | Lesk | G06Q 20/102 | 705/30 |
| 7,941,351 B1* | 5/2011 | Rosenfeld | G06Q 20/10 | 705/30 |
| 8,103,566 B1* | 1/2012 | Petruzzi | G06Q 40/00 | 705/35 |
| 8,374,961 B2* | 2/2013 | Vancini | G06Q 30/04 | 705/42 |
| 8,484,106 B1* | 7/2013 | Vu | G06Q 40/123 | 705/31 |
| 8,498,910 B1* | 7/2013 | Grossblatt | G06Q 40/125 | 705/32 |
| 9,418,387 B1* | 8/2016 | Aaron | G06Q 20/10 | |
| 9,454,577 B1* | 9/2016 | Kapoor | G06Q 30/04 | |
| 2002/0133459 A1* | 9/2002 | Polk | G06Q 20/22 | 705/40 |
| 2003/0069839 A1* | 4/2003 | Whittington | G06Q 10/10 | 705/38 |
| 2004/0019542 A1* | 1/2004 | Fuchs | G07C 1/14 | 705/32 |
| 2004/0049436 A1* | 3/2004 | Brand | G06Q 40/12 | 705/30 |
| 2005/0109836 A1* | 5/2005 | Ben-Aissa | G10L 17/00 | 235/380 |
| 2006/0064313 A1* | 3/2006 | Steinbarth | G06Q 40/08 | 705/322 |
| 2008/0041942 A1* | 2/2008 | Aissa | G06Q 20/341 | 235/382 |
| 2008/0215472 A1* | 9/2008 | Brown | G06Q 20/40 | 705/35 |
| 2008/0301762 A1* | 12/2008 | Malcolm | G06Q 10/063 | 726/1 |
| 2009/0106053 A1* | 4/2009 | Walker | G06Q 40/125 | 705/4 |
| 2010/0076877 A1* | 3/2010 | Lenahan | G06Q 40/125 | 705/32 |
| 2010/0094666 A1* | 4/2010 | Pendergrass | G06Q 40/12 | 705/4 |
| 2012/0054088 A1* | 3/2012 | Edrington | G06Q 40/025 | 705/38 |
| 2013/0085796 A1* | 4/2013 | Ruffolo | G06Q 10/105 | 705/7.18 |
| 2014/0180919 A1* | 6/2014 | Brown | G06Q 20/12 | 705/42 |
| 2014/0351721 A1* | 11/2014 | DeLuca | G06F 3/1423 | 715/760 |
| 2015/0095077 A1* | 4/2015 | Ruffolo | G06Q 40/125 | 705/7.13 |
| 2016/0026981 A1* | 1/2016 | Collins | G06Q 10/105 | 705/40 |
| 2016/0048929 A1* | 2/2016 | Parento | G06Q 20/10 | 705/32 |
| 2016/0086261 A1* | 3/2016 | Shah | G06Q 10/105 | 705/38 |
| 2016/0140528 A1* | 5/2016 | Shaaban | G06Q 30/04 | 705/34 |
| 2016/0163001 A1* | 6/2016 | Murrell | G06Q 10/105 | 705/39 |
| 2016/0371661 A1* | 12/2016 | Shah | G06Q 20/401 | |
| 2017/0004550 A1* | 1/2017 | Shaaban | G06F 21/62 | |
| 2018/0330451 A1* | 11/2018 | Volberg | G06Q 40/125 | |
| 2020/0242605 A1* | 7/2020 | Shah | G06Q 40/025 | |

\* cited by examiner

Fig.1

Favourite Widgets Ltd    Home  About  Contact                    Register  Login

⇥] Log in

| Use a local account to log in | Use another service to log in |
|---|---|
| Employee number [0013577]<br>Password [········]<br>[Login]<br>Register as a new user | [Google] |

Fig.2

Favourite Widgets Ltd    Home  About  Contact          Admin ▾ Profile ▾  Login

🐖 Define splits

Split details

Employee name (number)  John Doe (0013577)
     Pay period (group)  2016-10 (PG1)
            Net pay  1680.97

| Splits | October 27<br>€420.24 | November 3<br>€319.38 | November 10<br>€302.57 | November 17<br>€319.38 | November 24<br>€319.40 |
|---|---|---|---|---|---|
| Slide to<br>adjust splits | ▭ | ▭ | ▭ | ▭ | ▭ |

[Update]

EMPLOYEE DETERMINED PAYROLL PAYMENT PROCESSING METHOD AND SYSTEM

FIELD OF THE INVENTION

The invention relates to processing of payroll payments from an employer to employees via an application updated by the employee to determine their pay frequency.

PRIOR ART DISCUSSION

At present many large employers send files to external or internal payroll systems, which calculate gross-to-net ("GTN") amount data for the employees along with the data necessary to provide a payslip. This is a useful service because the payroll system is typically very sophisticated in terms of being programmed according to the full range of human resource and taxation rules. Also, for many external hosted services there are trained staff at hand to handle queries from employees and employer human resource personnel alike.

However, a problem which arises often is that the payroll cycle is very long for some employees who are paid less frequently. For example an employee may prefer to be paid on a weekly basis however employers prefer to pay monthly due to cost. However, if the employer were to engage the services of the payroll hosted service on a weekly basis the cost can be very high in terms of both fees to the service providers and also human resource personnel time. There would also be a considerable extent of additional messaging and file transfer traffic, in addition to employer additional data processing resource requirements.

As a result some employers provide only the service of long-period wage payments, even though shorter periods would suit at least some of their employees.

U.S. Pat. No. 9,418,387 (Square Inc.) describes customizable payroll processing in which an employee can designate a customized payroll pay period. Purchase of goods or services from a merchant can be integrated with employer wage payments. It appears however that such an arrangement would require the employer to have complex data processing resources to cater for the level of customisation involved while consistently complying with the human resources and taxation rules.

U.S. Pat. No. 6,401,079 (InLeague, Inc) describes a web-based payroll and benefits administration system.

U.S. Pat. No. 6,411,938 (Intuit, Inc) describes a client-server payroll processing system.

The invention is directed towards providing a payroll processing method with technical operations to provide flexibility to employers and employees as to the pay periods used, in a manner which has minimal technical impact on employer systems and payroll servers. Another related objective is to provide a method which minimises human time input by automating aspects of payroll processing in a manner which allows per-employee versatility in payment periods.

SUMMARY OF THE INVENTION

We describe a method of processing payroll payments for employees, the method being performed by a payment processing system and employee devices and comprising the steps of:
the payment processing system:
  receiving from an employer computer net pay data for employees for a long period,
  communicating with the employee devices to determine a desired payment split over the long period, in which the payment processing system automatically notifies an employee device of opening of a window for user editing of a payment split profile, and subsequently being instructed by the employee device as to edits to said profile,
  allowing access by the employee device to edit the profile after logging on to the payment processing system with access security credentials, and
  for each payment at the end of a split period the payment processing system transmitting a bank credit transfer file to cause the wage payments to be made;
wherein the payment processing system has a default payment split profile for each employee, for use in the event of failure by an employee device to edit after said notification.

The employer computer may communicate with a payroll server to obtain the net pay data, and the format of the net pay data received by the payment processing system is that provided by a payroll server.

Preferably, payment notifications are generated after said step of sending said file to cause the wage payments to be made, and said notifications are sent to the employee devices.

Preferably, for said step of transmitting a bank credit transfer file the payment processing system sends the credit transfer file to an employer computer, in a format suitable for the employer computer to subsequently send said file to the bank server. The payment processing system may receive payslip documents from the employer computer and use said documents to cause said wage payments to be made.

Preferably, the server updates employee files which it holds with net pay data and payslip details, said updates including:
  calculating control totals for the uploaded file and comparing them with user-entered values,
  updating employee net pay for short pay period,
  calculating pay period splits using default percentages or totals or an employee's previously entered preferred split percentages,
  storing the uploaded file in a database for subsequent access for an audit trail.

Preferably, the payment processing system generates a file for a bank server in a format in accordance with a pay group associated with the employer to provide multiple files per long period, by:
  reading employees in the given pay group,
  calculating control totals,
  generating SEPA or BACS files using employee data and configuration data,
  storing the generated file in a relational database,
  providing a link to a payroll administrator interface for downloading the file.

Preferably, the payment processing system comprises an interfacing server, a storage server, and a processing server, and the steps of performing payslip processing and interfacing with the employee device are performed by said servers upon internal signalling and file transfer between said servers.

Preferably, the interfacing server receives a compressed payslip file from an employer computer, decompresses said file, and parses payslip datasets retrieved from said decompressed file and renames each identified payslip dataset according to a pre-defined naming convention and sends said re-named datasets as payslip files to the storage server.

The interfacing server may perform validation of the datasets by ensuring that the decompressed file follows a defined nomenclature including an employee identifier, an employee pay period, and an employee name, and checks that the employee identifier and the employee name both exist and refer to the same entry in an employee table in the database server, and performs the subsequent step of retrieving an employee's linked user profile from said database.

Preferably, the storage server detects as an upload event reception of the payslip file from the interfacing server and stores them in an archiving database.

Preferably, the storage server sends an upload to the processing server, which extracts the payslip sequentially and assigns payslip files to a database folder, and sends a copy of the uploaded compressed file, containing the payslips, to the processing server.

The processing server may automatically assign the payslip files to a relevant folder in a database by extracting information from a file name according to structured fields of the file name, said structured fields including a defined nomenclature including an employee identifier, and an employee pay period.

Preferably, the payment processing system performs additional steps of interfacing with an employee device as follows:
the storage server storing payslip files,
the storage server sending a status message indicating success or fail of said storage to the interfacing server,
the interfacing server sending a notification to an employee software application on the employee device to indicate that the payslip is available to access via a firewall,
the interfacing server processing a consequent employee device log-in, and processing further interactions including any further access control security steps in which the employee device application requests a payslip from the system,
the interfacing server requesting a payslip PDF file from the storage server, and
downloading said file to the employee device.

We also describe a payment processing system comprising digital data processors and communication interfaces, wherein said data processors are configured to perform a method of processing payroll payments for employees, the method comprising the steps of:
receiving from an employer computer net pay data for employees for a long period,
communicating with employee devices to determine a desired payment split over the long period, including automatically notifying an employee device of opening of a window for user editing of a payment split profile, and subsequently managing employee device log-in with access security credentials and receiving and processing instructions from the employee device as to edits to said profile, and
for each payment at the end of a split period transmitting a bank credit transfer file to cause the wage payments to be made according to said payment split,
wherein the payment processing system has a default payment split profile for each employee, for use in the event of failure by an employee device to edit after said notification Preferably, the payment processing system is configured to generate payment notifications after said step of sending said file to cause the wage payments to be made, and to send said notifications to the employee devices. Preferably, the payment processing system is configured to, for performing said step of transmitting a bank credit transfer file, send the credit transfer file to an employer computer in a format suitable for the employer computer to subsequently send said file to the bank server.

Preferably, the payment processing system is configured to receive payslip documents from the employer computer and to use said documents to cause said wage payments to be made.

The payment processing system may comprise an interfacing server, a storage server and a processing server, and said servers are configured to performs the steps of performing payslip processing and interfacing with the employee device upon internal signalling and file transfer between said servers.

Preferably, the interfacing server is configured to receive a compressed payslip file from an employer computer, to decompresses said file, to parse payslip datasets retrieved from said decompressed file, to rename each identified payslip dataset according to a pre-defined naming convention, and to send said re-named datasets as payslip files to the storage server.

Preferably, the interfacing server is configured to perform validation of the datasets by ensuring that the decompressed file follows a defined nomenclature including an employee identifier, an employee pay period, and an employee name, and checks that the employee identifier and the employee name both exist and refer to the same entry in an employee table in the database server, and to perform the subsequent step of retrieving an employee's linked user profile from said database.

Preferably, the storage server is configured to detect as an upload event reception of the payslip file from the interfacing server and to stores them in an archiving database.

Preferably, the storage server is configured to send an upload to the processing server, which is configured to extract the payslip sequentially and to assign payslip files to a database folder, and to send a copy of the uploaded compressed file, containing the payslips, to the processing server.

Preferably, the processing server is configured to automatically assign the payslip files to a relevant folder in a database by extracting information from a file name according to structured fields of the file name, said structured fields including a defined nomenclature including an employee identifier, and an employee pay period.

Preferably, the payment processing system is configured to perform additional steps of interfacing with an employee device as follows:
the storage server storing payslip files,
the storage server sending a status message indicating success or fail of said storage to the interfacing server,
the interfacing server sending a notification to an employee software application on the employee device to indicate that the payslip is available to access via a firewall,
the interfacing server processing a consequent employee device log-in, and processing further interactions including any further access control security steps in which the employee device application requests a payslip from the system,
the interfacing server requesting a payslip PDF file from the storage server, and downloading said file to the employee device.

The invention also provides a non-transitory computer storage medium comprising software code for performing the steps of a method of any embodiment when executed by a digital data processor.

ADDITIONAL STATEMENTS

According to the invention, there is provided a method of processing payroll payments for employees, the method being performed by a payment processing server and comprising the steps of the payment processing server:
(a) receiving net pay data for employees for a long period,
(b) communicating with employee devices to determine a desired payment split over the long period, and
(c) for each payment at the end of a split period transmitting a bank credit transfer file to cause the wage payments to be made.

In one embodiment, in step (a) the net pay data is received from an employer computer.

In one embodiment, the employer computer communicates with a payroll server to obtain the net pay data.

In one embodiment, for the step (b) the payment processing server automatically notifies an employee device of opening of a window for user editing of a payment split profile, and subsequently being instructed by the employee device as to edits to said profile.

In one embodiment, the payment processing server has a default payment split profile for each employee, for use in the event of failure by an employee device to edit after said notification.

In one embodiment, the employee device edits the profile after logging on to the payment processing server with access security credentials.

In one embodiment, for step (c) the payment processing server sends the credit transfer file to an employer computer, and the employer computer subsequently sends said file to the bank server.

In one embodiment, payment notifications are generated after step (c) and sent to the employees.

In another aspect, the invention provides a payment processing server for processing payroll payments for employees, the server being configured to perform steps of:
receiving net pay data for employees for a long period,
communicating with employee devices to determine a desired payment split over the long period, and
for each payment at the end of a split period transmitting a bank credit transfer file to cause the wage payments to be made.

In one embodiment, for the step (b) the payment processing server is configured to automatically notify an employee device of opening of a window for user editing of a payment split profile, and to subsequently be instructed by the employee device as to edits to said profile.

In one embodiment, the payment processing server has a default payment split profile for each employee, for use in the event of failure by an employee device to edit after said notification.

In one embodiment, the server is configured to allow access by an employee device with access security credentials.

In one embodiment, for step (c) the payment processing server is configured to send the credit transfer file to an employer computer, so that the employer computer can subsequently send said file to a bank server.

In another aspect, the invention provides a non-transitory computer readable medium comprising software code for performing steps of a method as defined in any embodiment when executed by a digital processor.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
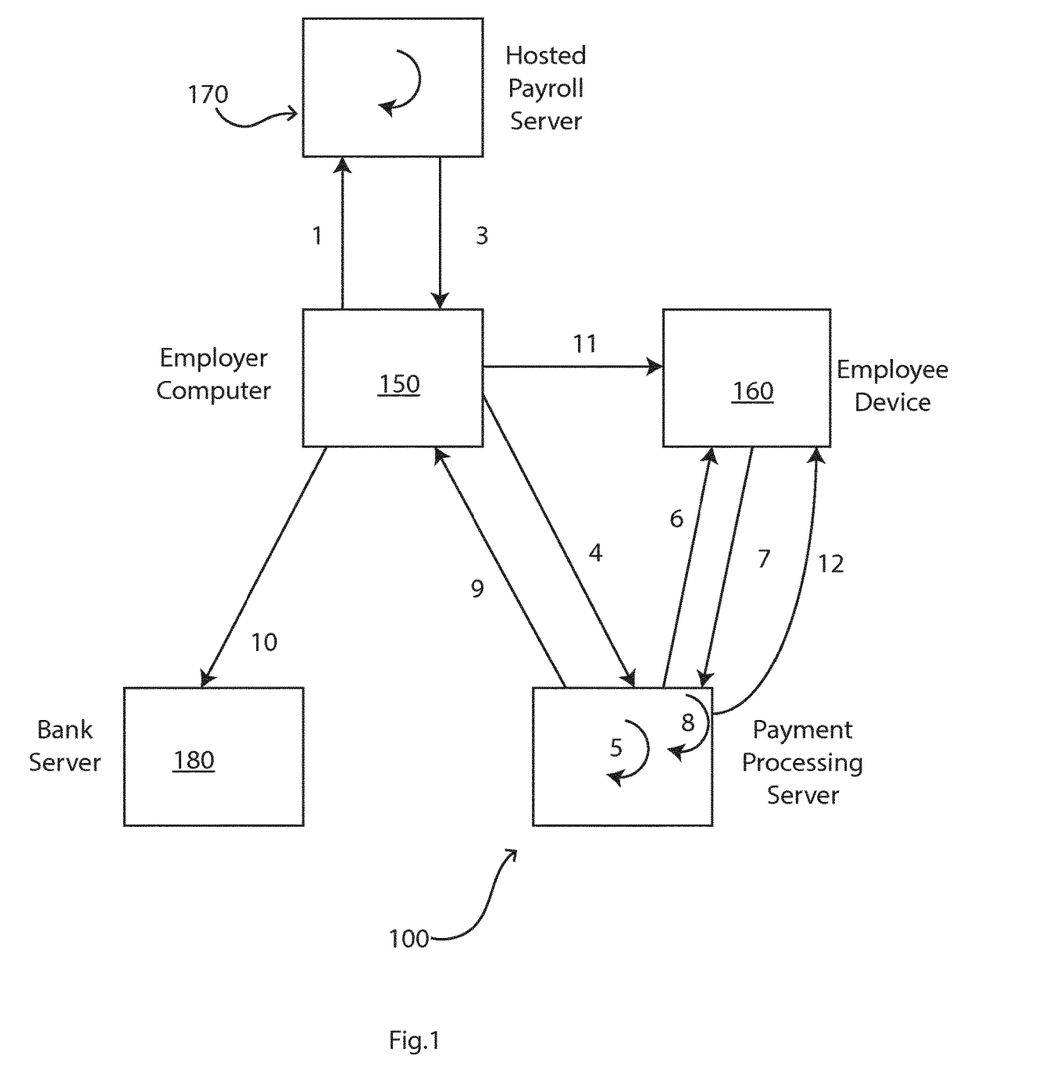
FIG. 1 is a block diagram showing the major components involved in a payroll payment processing method of the invention, incorporating a flow diagram illustrating their operations.

Referring to FIG. 1 a method of steps 1 through 12 is performed by components including:
100, a payment processing server;
150, employer computer;
160, employee device;
170, hosted payroll server; and
180, bank server.

The servers 170 and 180 are conventional servers for payroll service hosting and bank transaction processing respectively. They do not need to be modified for the invention, which in fact is one of the major advantages of the invention. The payment processing ("Flexiwage") server 100 is in this embodiment on the Microsoft Azure™ platform running the Windows™ server operating system. On this hardware platform a Node.js web application interacts with a MongoDB™ database.

The employer computer 150 may be any conventional computing device such as desktop, laptop, or tablet computer programmed to interface with the other components illustrated but without needing to have server capabilities. Likewise, the employee device 160 may be of any user device type including a smartphone, tablet, laptop computer to give some examples.

The method of processing payroll payments for employees is performed so that the employee can with access security set short pay periods and have wage payments made according to their profile. This avoids need to re-configure a payroll server or an employer computer. The system 100 receives 4 from an employer computer 150 net pay data for employees for a long period, and communicates with the employee devices (160) to determine a desired payment split over the long period, and automatically notifies (6, 206) an employee device (160) of opening of a window for user editing of a payment split profile, and subsequently are instructed (7, 207) by the employee device as to edit the profile. The system 100 allows access by the employee device (160) to edit the profile after logging on to the payment processing server (100, 200) with access security credentials. And for each payment at the end of a split period transmit (9, 209) a bank credit transfer file to cause the wage payments to be made. There is a default payment split profile for each employee, for use in the event of failure by an employee device to edit after said notification.

The following describes in more detail how the method of the invention provides a large degree of automation of payroll processing aspects to allow per-employee versatility in choice of payroll periods, with little or no impact on operation of the conventional known hosted payroll server 170 and employer computer.

Hardware Aspects

As noted above the hosted payroll server 170, the employer computer 150, the bank server 180 are conventional and are not modified in hardware terms for the invention, and there is very little software modification.

The payment processing server 100 hardware platform is a Dell PowerEdge T30, Intel Xeon E3-1225v5@3.3 GHz, 8 GB RAM, 1 TB storage. This server hosts the HTTP server, database and relevant technologies.

Method Steps for One Example

The following describes the major steps of a method of the invention, implemented by the components 100, 150, 160, 170, and 180.

Step 1

The employer computer 150 sends a file to the payroll server 170 including a gross pay amount for each employee. This is done in a conventional manner, such as by CSV (comma separated variable) file download. This file is sent once per "long" period, which may be two weeks or a month for example (fortnightly and monthly payrolls). Hence, the hosted service only needs to be used once per long period.

Step 2

The payroll server 170 calculates the full long-period payroll data for each employee, including the gross-to-net ("GTN") amount per employee and the total the net pay amount for the long period. Again, this is conventional for such a server and it does not need to be re-configured in any way.

Step 3

The payroll server 170 sends the GTN data including the GTN Report which confirms the total gross and net amounts for the payroll run, to the employer computer 150. Again, this is conventional.

Step 4

The employer computer 150 sends the GTN data to the Flexiwage server 100 via an HTTP Post over an SSL connection. This is done instead of the conventional step of providing a file to the bank server for the payment transactions. This requires minimal modification of the software of the employer computer 150.

Step 5

The Flexiwage server 100 updates employee files which it holds with net pay data and payslip details. These updates are as follows:
(i) Calculates control totals for the uploaded file and compares with the user entered values.
(ii) Updates employee net pay for the pay period.
(iii) Calculates the splits using default percentages or the employee's previously entered preferred split percentages. In an alternative embodiment totals are calculated instead of percentages.
(iv) Updates the employee's name as it appears on the payslip. This step may be omitted in some embodiments.
(v) Stores the uploaded file in a database for future reference by the employee as part of an audit trail.
(vi) Updates the record to open the new pay period for the pay group.

Step 6

Using address data in the employee files, the Flexiwage server 100 transmits messages to the employees to inform them that they can now engage with the server 100 to adjust payroll payments split over the long period in a desired manner. This is per-employee.

Step 7

Figure 2:
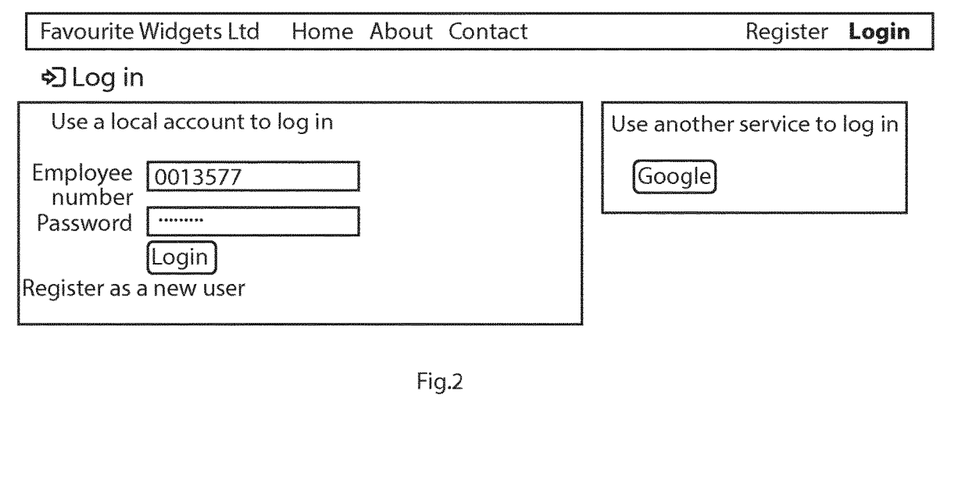
FIGS. 2 and 3 are sample screens for employee login and defining splits, respectively.
Figure 3:
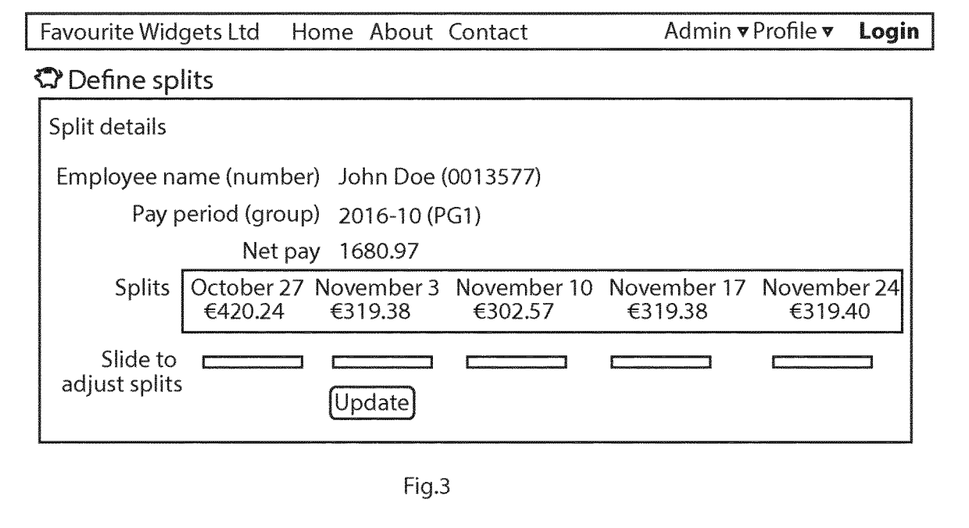

Each employee logs on to the Flexiwage server 100 as shown in FIG. 2 and selects splits for payment during the long period as shown in FIG. 3. Security is achieved by logging in with a unique employee number and password which is issued by the HR administrator.

The employee inputs may be by way of editing a profile, with effect for the current long period only, or until a next profile edit.

Step 8

The Flexiwage server 100 generates a file for the bank server 180 in an applicable format, such as SEPA or BACS for example. This is done in accordance with the number of pay groups associated with the employer. As a result, multiple SEPA or BACS files are generated per long period. The processing is as follows:
1. Reads all employees in the given pay group
2. Calculates control totals
3. Generates SEPA or BACS file using employee data and tenant configuration data
4. Stores the generated file in MongoDB
5. Provides a link to the payroll administrator to download the file Step 9

The employer computer 150 downloads the SEPA or BACS file. This is done once per pay cycle per pay group.

Step 10

The employer computer 150 submits the SEPA or BACS file to the bank server 180. This file is processed automatically by the bank server to cause the employee accounts to be credited.

Step 11

The employer computer sends payslip data derived from step 3 to the employee device 160. This is the "official" payslip, for the long period.

Step 12

The Flexiwage server 100 generates and sends to the employee device pseudo payslip data messages, one per split payment made.

Alternative System and Method

Figure 4:
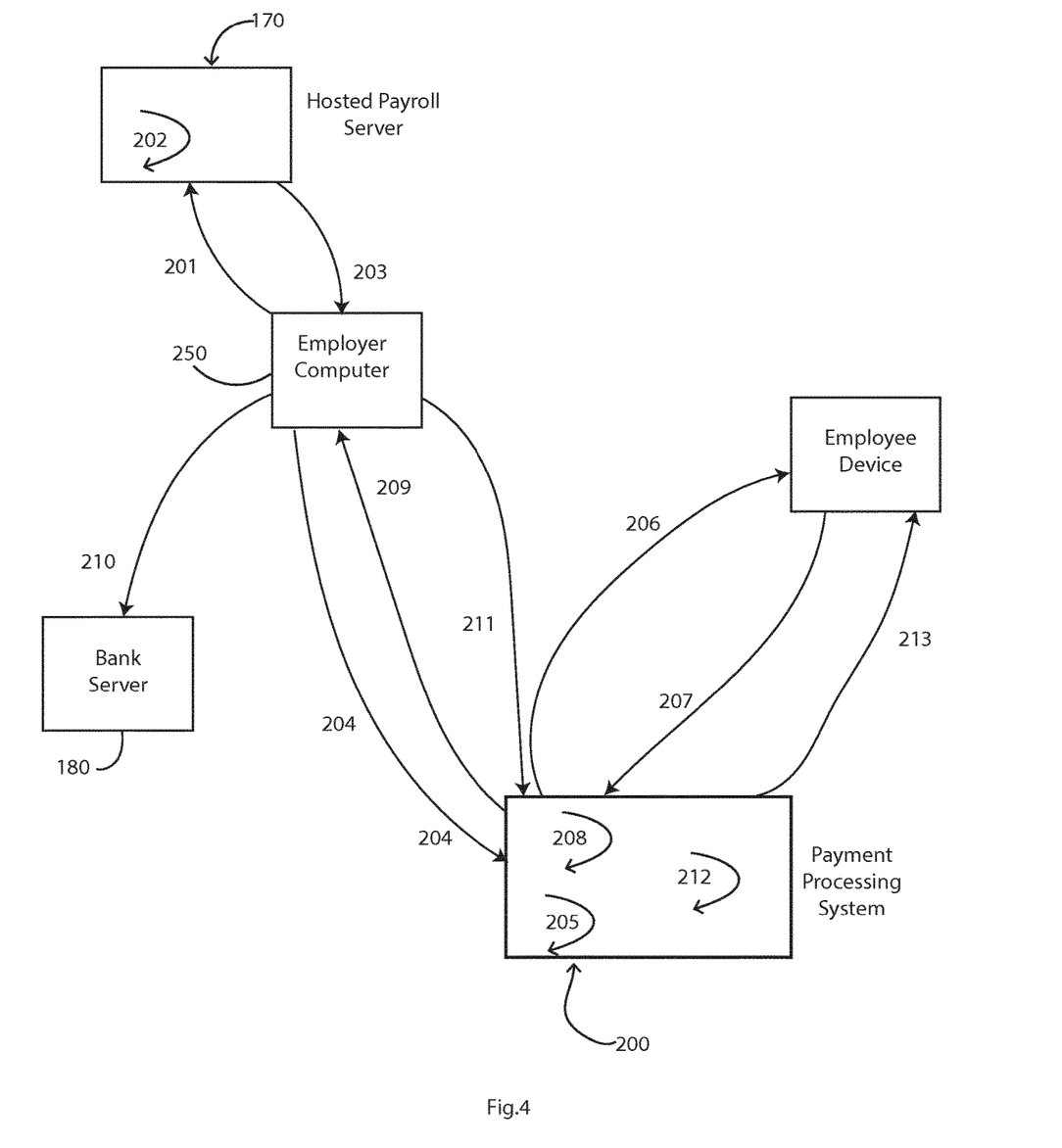
FIG. 4 is a flow diagram for an alternative system.

Referring to FIG. 4, an alternative system comprises an employer computer 250 and a payment processing system 200. These servers interface with the hosted payroll server 170 and the bank server 180. The system performs operations 201 to 213, as follows:
- 201: Employer computer 250 sends a long period file to the payroll server 170, as for Step 1 of FIG. 1.
- 202: Payroll server 170 operations as for Step 2.
- 203: GTN data is sent to the employee computer, as in Step 3.
- 204: Employer computer 250 sending the GTN data to the payment processing ("Flexiwage") system 200, as for Step 4, being via an HTTP Post over an SSL connection
- 205: The Flexiwage system 200 updating employee files, as for Step 5.
- 206: The Flexiwage system 200 transmits messages to employee device, as Step 6.
- 207: Employee device logs in, as Step 7.
- 208: Flexiwage system 200 generates a file for the bank server, as for Step 8.
- 209: This file is downloaded by the employer computer 250, as in Step 9.
- 210: The employer computer 250 sends the SEPA or BACS file to the bank server 180, as Step 10. The bank can then start processing this file to transfer the required funds to the employee bank accounts.
- 211: The employer computer 250 sends the payslip data to the payment processing system 200. This is in the form of a compressed "ZIP" file of payslips in PDF™ (Portable Document Format) format, named by employee reference. The ZIP file contains all of the PDF files in whatever order they are added. The ZIP file is merely a container for the PDF files and allows one optimised upload rather than a number of uploads for each PDF file.

212,213: Operations of the payment processing server 200 to process the payslips and notify the employee device. This allows the employee to access the funds which have been available in his or her bank account since step 210.

Figure 5:
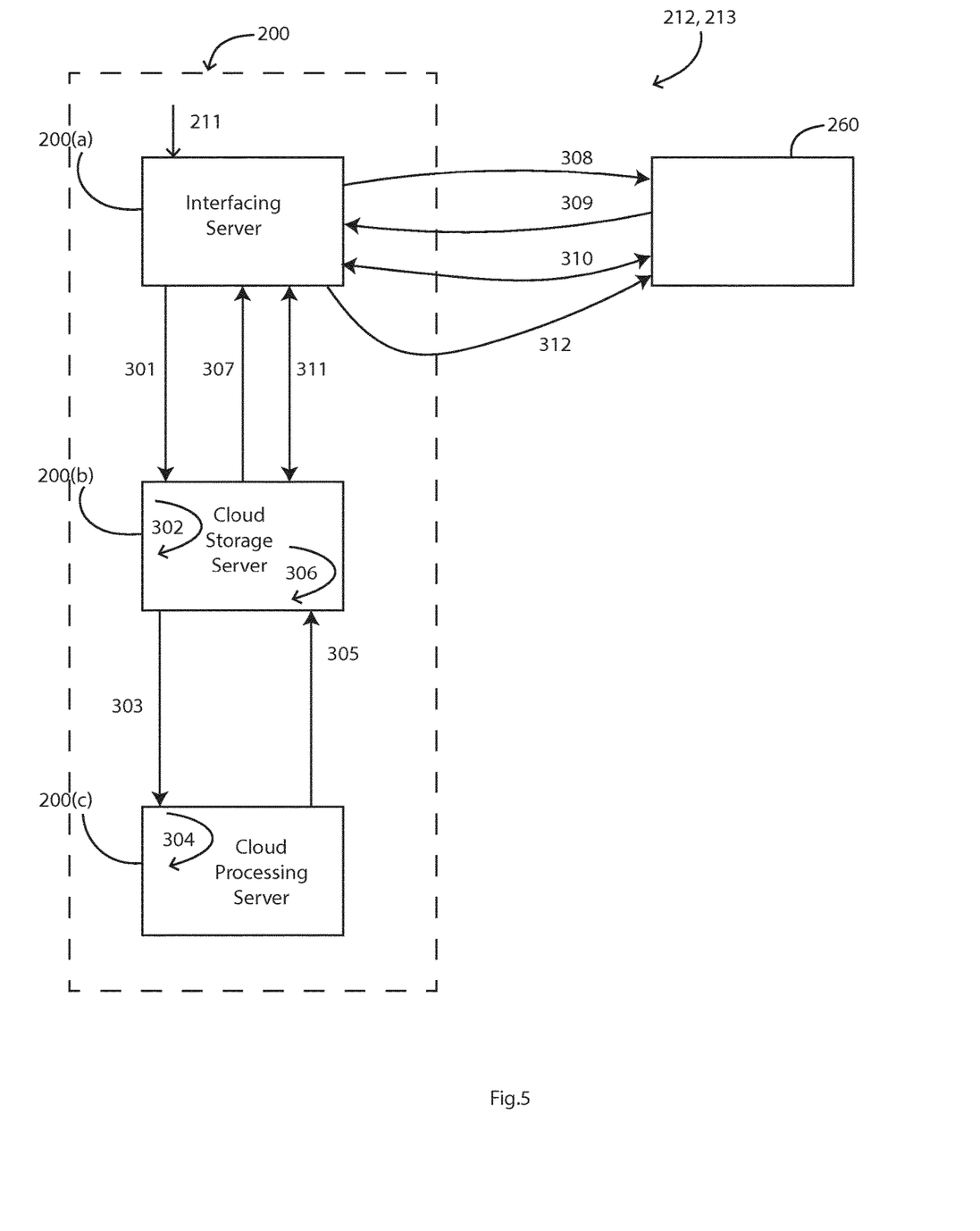
FIG. 5 is a more detailed flow diagram for some of the operations of FIG. 4.

In more detail, referring to FIG. 5 the payment processing system 200 comprises:

an interfacing server 200(*a*);

a storage server 200(*b*), in this case located in the Cloud;

a processing server 200(*c*), also located in the Cloud.

The three components 200(*a*), 200(*b*) and 200(*c*) of the system 200 interface with each other and with the employee device as set out below to implement the operations 212 and 213, after the employer computer 250 has transmitted to it the payslip PDF file in step 211.

Hardware Aspects of Payment Processing System 200

The interfacing server 200(*a*) is a container-based cloud platform as a service to host its PHP (Hypertext Preprocessor) code which is served via PHP-FPM (PHP), Fast Page Mode) by the latest version of Apache™. The PHP support extends up to applications using PHP 7.1(64-bit) which allows the server 200(*a*) to make use of caching, hashing and AES 256 MAC signed encryption technology.

The PHP runtime also has OPcache™ enabled for improved performance, with a configuration optimized for the specific characteristics of Heroku's virtual container dynos.

The server 200(*a*) makes use of dedicated performance-grade dynos which run on a minimum of 2.5 GB of RAM. This helps ensure that all user requests are met, horizontal autoscaling occurs when load increases, dynos never enter a sleep state and are prebooted when cycled.

Cloud Storage Server 200(*b*)

This is an object-based storage platform that is easily accessed, easily managed and infinitely expandable data warehouse. Each object uploaded to a bucket of the server 200(*b*) is independent in terms of its properties and associated permissions. Within the service provided by the platform 200(*b*), users can create buckets which are used to store object based files. When buckets are created users specify which region the Bucket should be deployed in. Each object uploaded to a bucket is independent in terms of its properties and associated permissions. By default, data stored is written across multiple devices in multiple locations providing resiliency.

Cloud Processing Server 200(*c*)

This is an AWS Lambda™ platform, a computer service that can run code without provisioning or managing servers. It executes the payment processing NodeJS distribution code only when needed and will scale automatically, from a few requests per day to thousands per second due to a high-availability compute infrastructure. The payment processing code hosted on this platform runs in response to upload and data change events, in linked buckets. A standard level of available RAM is 128 MB but this will adjust as computing power requirements change.

Operation of the Payroll Processing System 200

301. The interfacing server 200(*a*) reads the ZIP file received in step 211, taking each portion in turn. It performs parsing of the file and also performs validation of the individual portions. It reads each file individually within the ZIP file, ensuring that each file is a PDF file It then renames the payslip file according to a required naming convention, such as vvid_payperiod_name.

The interfacing server 200(*a*) performs validation of the individual portions by ensuring that the file follows a defined nomenclature of Employee-ID_PayPeriod_EmployeeName.pdf. The PayPeriod is of a valid format such as YearMonthDay (YYYYMMDD) e.g.: 20170128. The EmployeeID and the EmployeeName both exist and refer to the same entry in the relevant company's employee table in the Flexiwage database. The employee's linked user profile UUID is retrieved successfully once the existence of EmployeeID and EmployeeName is verified. Once the user's UUID is verified the interfacing server renames the payslip file according to the required naming convention, i.e. UUID_PayPeriod_EmployeeName.

302 The ZIP file is renamed to a required naming convention and uploaded by the interfacing server 200(*a*) to the storage server 200(*b*), such as payslips_companyID_payperiod.zip.

303 The cloud storage server 200(*b*) fires an upload event.

304 The processing server 200(*c*) detects the upload event.

305 The processing server 200(*c*) processes the ZIP file. It extracts the payslip files one by one, and assigns the payslip files to a relevant folder in Cloud storage. This is done by extracting information from the filename that was set in step 301. The filename is separated into three different parts based on the position of the underscores "_" in the filename.

Section 1 from the filename is the user's UUID, defined by the information from the start of the filename to the position of the first underscore. This provides the correct user folder to eventually place the user payslip within.

Section 2 from the filename is the pay period to which the payslip belongs. This value is defined by the information between the first two underscores that are included in the filename.

The addition of Section 1 and Section 2 provides the path for the placement of the user's payslip. At this point the file is renamed to payslip.pdf e.g.: f284f1b2-dc68-4f6f-b88b-08cf9e5f3274_20170128_niallcusack.pdf would be stored at: f284f1b2-dc68-4f6f-b88b-08cf9e5f3274/20170128/payslip.pdf A copy of the payslip is also posted to f284f1b2-dc68-4f6f-b88b-08cf9e5f3274/latest/payslip.pdf

306 Payslip files are stored in Cloud storage by the storage server 200(*b*).

307 Success/Fail message sent to the interfacing server 200(*a*).

308 The interfacing server 200(*a*) sends a notification to an employee software application on the employee device 260 to indicate that the payslip is available to access via a firewall.

309 The employee logs in to the Flexiwage portal, hosted by the interfacing server 200(*a*).

310 There are interactions, including any further access control security steps in which the employee device application requests a payslip from the system 200.

311 The interfacing server 200(*a*) requests a payslip PDF file from the storage server 200(*b*).

312 Payslip is downloaded to employee device 260 by the interfacing server 200(*a*).

Any request is via HTTP over SSL so is secure and encrypted.

The information extractions are performed via string manipulation, as set out above for step 304.

Advantages

The invention achieves optimum automated processing steps for payroll processing in a manner which has little or no impact on existing systems such as bank servers, payroll servers, and indeed employer computers or servers. The payroll server can operates in a conventional manner, once per long period. Therefore, if the payroll service is external the employer only need to pay fees once per long period. If internal, there is less demand on time of the human resources personnel. The bank server operates in a conventional manner, executing credit transactions upon receipt of the BACS or SEPA files from a legitimate source.

The above technical operations provide the personal and financial benefits of improved cash flow for the employer as less funds are required when spreading payments to employees over the long period, and greater budgeting control for employees over the long period as payment amounts can be scheduled to suit personal financial circumstances.

Variations on the method include that employees are allowed to split their payments over multiple bank accounts, and/or to allow amounts to be carried over past the end of the long period.

The payment processing system infrastructure of the invention can automatically scale with growth in the number of employees, meaning that the employer systems do not need to expand their server infrastructure with additional functionality for data security, encryption, and updates.

Employees can move between businesses or jobs using their Flexiwage account rather than having to create new accounts each time for each business. This allows employee users to retain their history rather than requiring that the employer systems track their preferences. Also, the invention increases security for a user and reduces security risk and overheads for the business. The invention avoids need for payroll servers or company servers to have API access for the users.

Referring specifically to the payment processing system architecture of FIG. 5, this allows for a large number of processes to be carried out concurrently without blocking or impacting negatively on the end-user experience. It provides permanent storage of files in the cloud with multiple backups available in multiple locations in case of server faults, DDOS attacks, natural disasters. Also, it allows the system to easily scale with a growing registered employee and employer base. Moreover, it allows the system to respond to heavy bursts of traffic by scaling up its services and scaling back down when not needed, improving response times. Also, the system provides a permanent audit trail and log trail. Also, the system modularises the split payment services allowing the host organisation to repair, replace or upgrade each module easily as needed without impacting on service.

The invention is not limited to the embodiments described but may be varied in construction and detail.

The invention claimed is:

1. A method of processing payroll payments for employees, the method being performed by:
    a payment processing server comprising a digital data processor and a database, and employee devices each and comprising a digital data processor and user interface,
    wherein the method includes steps of:
        the payment processing server:
            receiving from an employer computer net pay data for employees for a long period,
            communicating with the employee devices to determine a desired payment split over the long period, in which the payment processing server automatically notifies an employee device of opening of a window for user editing of a payment split profile, and subsequently being instructed by the employee device as to edits to said profile,
            allowing access by the employee device to edit the profile after logging on to the payment processing server with access security credentials, and
            for each payment at the end of a split period the payment processing server transmitting a bank credit transfer file to cause the wage payments to be made;
        wherein the payment processing server has a default payment split profile for each employee, for use in the event of failure by an employee device to edit after said notification.

2. The method as claimed in claim 1, wherein the employer computer communicates with a payroll server to obtain the net pay data, and the format of the net pay data received by the payment processing server is that provided by a payroll server.

3. The method as claimed in claim 1, wherein payment notifications are generated after said step of sending said file to cause the wage payments to be made, and said notifications are sent to the employee devices.

4. The method as claimed in claim 1, wherein for said step of transmitting a bank credit transfer file the payment processing server sends the credit transfer file to an employer computer, in a format suitable for the employer computer to subsequently send said file to the bank server.

5. The method as claimed in claim 1, wherein the payment processing server receives payslip documents from the employer computer and uses said documents to cause said wage payments to be made.

6. The method as claimed in claim 1, wherein the server updates employee files which it holds with net pay data and payslip details, said updates including:
    calculating control totals for the uploaded file and comparing them with user-entered values,
    updating employee net pay for the short pay period,
    calculating pay period splits using default percentages or totals or an employee's previously entered preferred split percentages,
    storing the uploaded file in a database for subsequent access for an audit trail.

7. The method as claimed in claim 1, wherein the payment processing server generates a file for a bank server in a format in accordance with a pay group associated with the employer to provide multiple files per long period, by:
    reading employees in the given pay group,
    calculating control totals,
    generating SEPA or BACS files using employee data and configuration data storing the generated file in a relational database,
    providing a link to a payroll administrator interface for downloading the file.

8. The method as claimed in claim 1, wherein the payment processing server comprises an interfacing server, a storage server, and a processing server, and the steps of performing payslip processing and interfacing with the employee device are performed by said servers upon internal signalling and file transfer between said servers.

9. The method as claimed in claim 1, wherein the payment processing server comprises an interfacing server, a storage server, and a processing server, and the steps of performing payslip processing and interfacing with the employee device are performed by said servers upon internal signalling and file transfer between said servers, and wherein the interfacing server receives a compressed payslip file from an employer computer, decompresses said file, and parses payslip datasets retrieved from said decompressed file and renames each identified payslip dataset according to a predefined naming convention and sends said re-named datasets as payslip files to the storage server.

10. The method as claimed in claim 1, wherein:
the payment processing server comprises an interfacing server, a storage server, and a processing server, and the steps of performing payslip processing and interfacing with the employee device are performed by said servers upon internal signalling and file transfer between said servers, and wherein the interfacing server receives a compressed payslip file from an employer computer, decompresses said file, and parses payslip datasets retrieved from said decompressed file and renames each identified payslip dataset according to a predefined naming convention and sends said re-named datasets as payslip files to the storage server;
the interfacing server performs validation of the datasets by ensuring that the decompressed file follows a defined nomenclature including an employee identifier, an employee pay period, and an employee name, and checks that the employee identifier and the employee name both exist and refer to the same entry in an employee table in the database server, and performs the subsequent step of retrieving an employee's linked user profile from said database.

11. The method as claimed in claim 1, wherein:
the payment processing server comprises an interfacing server, a storage server, and a processing server, and the steps of performing payslip processing and interfacing with the employee device are performed by said servers upon internal signalling and file transfer between said servers, and wherein the interfacing server receives a compressed payslip file from an employer computer, decompresses said file, and parses payslip datasets retrieved from said decompressed file and renames each identified payslip dataset according to a predefined naming convention and sends said re-named datasets as payslip files to the storage server;
the payment processing server comprises an interfacing server, a storage server, and a processing server, and the steps of performing payslip processing and interfacing with the employee device are performed by said servers upon internal signalling and file transfer between said servers, and wherein the interfacing server receives a compressed payslip file from an employer computer, decompresses said file, and parses payslip datasets retrieved from said decompressed file and renames each identified payslip dataset according to a predefined naming convention and sends said re-named datasets as payslip files to the storage server;
the storage server detects as an upload event reception of the payslip file from the interfacing server and stores them in an archiving database.

12. The method as claimed in claim 1, wherein:
the payment processing server comprises an interfacing server, a storage server, and a processing server, and the steps of performing payslip processing and interfacing with the employee device are performed by said servers upon internal signalling and file transfer between said servers, and wherein the interfacing server receives a compressed payslip file from an employer computer, decompresses said file, and parses payslip datasets retrieved from said decompressed file and renames each identified payslip dataset according to a predefined naming convention and sends said re-named datasets as payslip files to the storage server;
the payment processing server comprises an interfacing server, a storage server, and a processing server, and the steps of performing payslip processing and interfacing with the employee device are performed by said servers upon internal signalling and file transfer between said servers, and wherein the interfacing server receives a compressed payslip file from an employer computer, decompresses said file, and parses payslip datasets retrieved from said decompressed file and renames each identified payslip dataset according to a predefined naming convention and sends said re-named datasets as payslip files to the storage server;
the storage server detects as an upload event reception of the payslip file from the interfacing server and stores them in an archiving database;
the storage server sends an upload to the processing server, which extracts the payslip sequentially and assigns payslip files to a database folder, and sends a copy of the uploaded compressed file, containing the payslips, to the processing server.

13. The method as claimed in claim 1, wherein:
the payment processing server comprises an interfacing server, a storage server, and a processing server, and the steps of performing payslip processing and interfacing with the employee device are performed by said servers upon internal signalling and file transfer between said servers, and wherein the interfacing server receives a compressed payslip file from an employer computer, decompresses said file, and parses payslip datasets retrieved from said decompressed file and renames each identified payslip dataset according to a predefined naming convention and sends said re-named datasets as payslip files to the storage server;
the payment processing server comprises an interfacing server, a storage server, and a processing server, and the steps of performing payslip processing and interfacing with the employee device are performed by said servers upon internal signalling and file transfer between said servers, and wherein the interfacing server receives a compressed payslip file from an employer computer, decompresses said file, and parses payslip datasets retrieved from said decompressed file and renames each identified payslip dataset according to a predefined naming convention and sends said re-named datasets as payslip files to the storage server;
the storage server detects as an upload event reception of the payslip file from the interfacing server and stores them in an archiving database;
the storage server sends an upload to the processing server, which extracts the payslip sequentially and assigns payslip files to a database folder, and sends a copy of the uploaded compressed file, containing the payslips, to the processing server; and
the processing server automatically assigns the payslip files to a relevant folder in a database by extracting information from a file name according to structured fields of the file name, said structured fields including a defined nomenclature including an employee identifier, and an employee pay period.

14. The method as claimed in claim 1, wherein
the payment processing server comprises an interfacing server, a storage server, and a processing server, and the steps of performing payslip processing and interfacing with the employee device are performed by said servers upon internal signalling and file transfer between said servers, and wherein the interfacing server receives a compressed payslip file from an employer computer, decompresses said file, and parses payslip datasets retrieved from said decompressed file and renames each identified payslip dataset according to a pre-defined naming convention and sends said re-named datasets as payslip files to the storage server; and the payment processing server performs additional steps of interfacing with an employee device as follows:
  the storage server storing payslip files,
  the storage server sending a status message indicating success or fail of said storage to the interfacing server,
  the interfacing server sending a notification to an employee software application on the employee device to indicate that the payslip is available to access via a firewall,
  the interfacing server processing a consequent employee device log-in, and processing further interactions including any further access control security steps in which the employee device application requests a payslip from the server,
  the interfacing server requesting a payslip portable document file from the storage server, and downloading said file to the employee device.

15. A payment processing server comprising digital data processors and communication interfaces, wherein said data processors are configured to perform a method of processing payroll payments for employees, the method comprising steps of:
  receiving from an employer computer net pay data for employees for a long period,
  communicating with employee devices to determine a desired payment split over the long period, including automatically notifying an employee device of opening of a window for user editing of a payment split profile, and subsequently managing employee device log-in with access security credentials and receiving and processing instructions from the employee device as to edits to said profile, and
  for each payment at the end of a split period transmitting a bank credit transfer file to cause the wage payments to be made according to said payment split;
  wherein the payment processing server has a default payment split profile for each employee, for use in the event of failure by an employee device to edit after said notification.

16. The server as claimed in claim 15, wherein payment processing server is configured to generate payment notifications after said step of sending said file to cause the wage payments to be made, and to send said notifications to the employee devices.

17. The server as claimed in claim 15, wherein the payment processing server is configured to, for performing said step of transmitting a bank credit transfer file, send the credit transfer file to an employer computer in a format suitable for the employer computer to subsequently send said file to the bank server.

18. The server as claimed in claim 15, wherein the payment processing server is configured to receive payslip documents from the employer computer and to use said documents to cause said wage payments to be made.

19. The server as claimed in claim 15, wherein the payment processing server comprises an interfacing server, a storage server, and a processing server, and said servers are configured to performs the steps of performing payslip processing and interfacing with the employee device upon internal signalling and file transfer between said servers.

20. The server as claimed in claim 15, wherein the payment processing server comprises an interfacing server, a storage server, and a processing server, and said servers are configured to performs the steps of performing payslip processing and interfacing with the employee device upon internal signalling and file transfer between said servers; and wherein the interfacing server is configured to receive a compressed payslip file from an employer computer, to decompresses said file, to parse payslip datasets retrieved from said decompressed file, to rename each identified payslip dataset according to a pre-defined naming convention, and to send said re-named datasets as payslip files to the storage server.

21. The server as claimed in claim 15, wherein:
  the payment processing server comprises an interfacing server, a storage server, and a processing server, and said servers are configured to performs the steps of performing payslip processing and interfacing with the employee device upon internal signalling and file transfer between said servers; and wherein the interfacing server is configured to receive a compressed payslip file from an employer computer, to decompresses said file, to parse payslip datasets retrieved from said decompressed file, to rename each identified payslip dataset according to a pre-defined naming convention, and to send said re-named datasets as payslip files to the storage server; and
  the interfacing server is configured to perform validation of the datasets by ensuring that the decompressed file follows a defined nomenclature including an employee identifier, an employee pay period, and an employee name, and checks that the employee identifier and the employee name both exist and refer to the same entry in an employee table in the database server, and to perform the subsequent step of retrieving an employee's linked user profile from said database;
  the storage server is configured to detect as an upload event reception of the payslip file from the interfacing server and to stores them in an archiving database; and
  the storage server is configured to send an upload to the processing server, which is configured to extract the payslip sequentially and to assign payslip files to a database folder, and to send a copy of the uploaded compressed file, containing the payslips, to the processing server; and
  the processing server is configured to automatically assign the payslip files to a relevant folder in a database by extracting information from a file name according to structured fields of the file name, said structured fields including a defined nomenclature including an employee identifier, and an employee pay period.

22. The server as claimed in claim 15, wherein:
  the payment processing server comprises an interfacing server, a storage server, and a processing server, and said servers are configured to performs the steps of performing payslip processing and interfacing with the employee device upon internal signalling and file transfer between said servers; and
  the payment processing server is configured to perform additional steps of interfacing with an employee device as follows:
    the storage server storing payslip files,
    the storage server sending a status message indicating success or fail of said storage to the interfacing server, the interfacing server sending a notification to an employee software application on the employee device to indicate that the payslip is available to access via a firewall, the interfacing server processing a consequent employee device log-in, and processing further interactions including any further access control security steps in which the employee device application requests a payslip from the server, the interfacing server requesting a payslip portable document format file from the storage server, and downloading said file to the employee device.

23. A non-transitory computer storage medium comprising software code for performing the steps of a method as set out below when executed by a digital data processor of a payment processing server:

receiving from an employer computer net pay data for employees for a long period, communicating with the employee devices to determine a desired payment split over the long period, in which the payment processing server automatically notifies an employee device of opening of a window for user editing of a payment split profile, and subsequently being instructed by the employee device as to edits to said profile, allowing access by the employee device to edit the profile after logging on to the payment processing server with access security credentials, and for each payment at the end of a split period the payment processing server transmitting a bank credit transfer file to cause the wage payments to be made; storing a default payment split profile for each employee, for use in the event of failure by an employee device to edit after said notification.

\* \* \* \* \*